J. B. Farquhar,
Bee Hive.
No. 90,649.
Patented June 1, 1869.
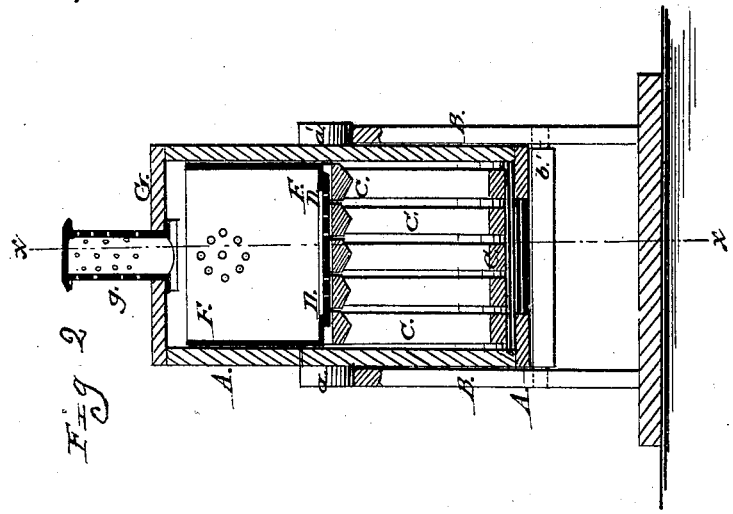
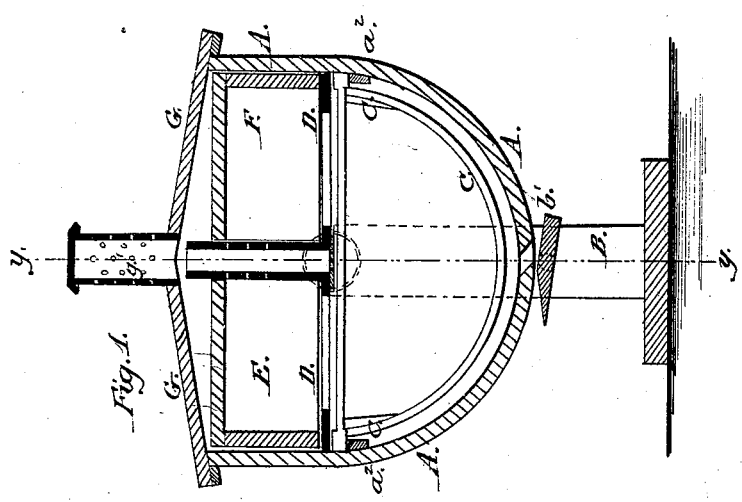
Witnesses:
John F. Brooks
E. Greene Collins
Inventor:
J. B. Farquhar
by Munn & Co.
Attorneys

United States Patent Office.

I. B. FARQUHAR, OF BLOODY RUN, ASSIGNOR TO HIMSELF AND J. W. LINGENFELTER, OF BEDFORD, PENNSYLVANIA.

Letters Patent No. 90,649, dated June 1, 1869.

IMPROVEMENT IN BEE-HIVES.

The Schedule referred to in these Letters Patent and making part of the same.

*To all whom it may concern:*

Be it known that I, I. B. FARQUHAR, of Bloody Run, in the county of Bedford, and State of Pennsylvania, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 is a detail vertical section of my improved hive, taken through the line $x\ x$, fig. 2.

Figure 2 is a detail vertical section of the same, taken through the line $y\ y$, fig. 1.

Similar letters of reference indicate corresponding parts.

My invention has for its object to improve the construction of bee-hives, so as to make them more convenient in use, and more suitable for their purpose, than the hives constructed in the ordinary manner; and It consists in the construction and combination of the various parts, as hereinafter more fully described.

A represents the body of the hive, the lower part of which is made semi-cylindrical in form, as shown in fig. 1.

To the vertical sides or ends of the body A are attached pivots $a^1$, by which the hive is supported, and which rest in bearings in the upper ends of the supports or frame B.

The entrance for the bees is formed in the lower part of the body A, as shown in figs. 1 and 2, which is thus free from any bottom-board, that would enable worms to find their way into the hive, and which may be enlarged, or diminished, or entirely closed, by means of the board $b'$, the ends of which are pivoted to the frame B, or by changing the position of the hive, by means of its pivots $a^1$.

By this construction of the hive, and arrangement of the entrance, any dead bees or other refuse that may drop into the lower part of the hive, will find its way out through the entrance, thus saving the bees much labor.

To the sides of the body A, at the upper part of its semi-cylindrical portion, are attached cleats, $a^2$, upon which rest the ends of the semi-cylindrical frames C, designed to receive the comb, and which are designed to correspond in shape with the ordinary form of the combs.

The frames C are placed side by side, with a space of half an inch, more or less, between them, so as to allow the bees to have free access to the upper part of the hive.

D is the honey-board, extending across the hive, and resting upon projections formed upon the ends of the comb-frames C, as shown in fig. 1, so as to leave a space of about half an inch between the tops of the frames C and the board D.

The board D is slotted, to give the bees free access to the upper parts of the hive, said slots being so arranged as to be directly above the spaces between the said frames C.

E are the removable honey-boxes, which are placed in the upper part of the hive, and which rest upon the board D.

F is a chamber, which may be made of tin, which is placed between the honey-boxes E, and is attached to the board D.

The bottom and sides of the chamber F are perforated with numerous holes, to allow the air to pass through freely to all parts of the hive.

The chamber F also serves as a feeding-chamber, for, by pouring liquid sweets therein, the same will ooze through the perforations in the bottom, and the bees thereby permitted to take it up.

G is the cover, which fits upon the top of the hive, and which is provided with a ventilating-flue, $g'$, placed directly over the chamber F, and having its sides perforated, so as to allow the air to pass in freely.

Having thus described my invention,

I claim as new, and desire to secure by Letters Patent—

1. The slotted honey-board D, and ventilating and feeding-chamber F, in combination with each other, and with the frames C, and semi-cylindrical hive A, substantially as herein shown and described, and for the purpose set forth.

2. The supports B, and entrance-board $b'$, in combination with the pivoted semi-cylindrical hive A $a^1$, substantially as herein shown and described, and for the purpose set forth.

The above specification of my invention, signed by me, this 5th day of February, 1869.

I. B. FARQUHAR.

Witnesses:
 J. W. LINGENFELTER,
 JOHN B. JIMMERSON.